(12) United States Patent
Huang (10) Patent No.: US 10,178,721 B1
(45) Date of Patent: Jan. 8, 2019

(54) LIGHT EMITTING DEVICE DRIVER CIRCUIT AND CONTROL METHOD THEREOF

(71) Applicant: RICHTEK TECHNOLOGY CORPORATION, Zhubei, Hsinchu (TW)

(72) Inventor: Yi-Wen Huang, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/043,144

(22) Filed: Jul. 23, 2018

Related U.S. Application Data (60) Provisional application No. 62/545,161, filed on Aug. 14, 2017.

(30) Foreign Application Priority Data

Jun. 22, 2018 (CN) .......................... 2018 1 0650830

(51) Int. Cl.
*H05B 33/08* (2006.01)
(52) U.S. Cl.
CPC ..... *H05B 33/0815* (2013.01); *H05B 33/0845* (2013.01)
(58) Field of Classification Search
CPC ................ H05B 33/08; H05B 33/0815; H05B 33/0842; H05B 33/0845; H05B 33/0809; H05B 33/089; H05B 33/0851; H05B 37/02
See application file for complete search history.

(56) References Cited

U.S. PATENT DOCUMENTS

| 9,966,833 | B2 * | 5/2018 | Chen | ........................ H02M 1/15 |
| 2009/0134817 | A1 * | 5/2009 | Jurngwirth | ......... H05B 33/0827 315/307 |
| 2010/0308749 | A1 * | 12/2010 | Liu | .................... H05B 33/0815 315/307 |
| 2011/0148323 | A1 * | 6/2011 | Yao | .................... H05B 33/0827 315/295 |
| 2014/0340295 | A1 * | 11/2014 | Zhang | ................ H05B 33/0809 345/102 |
| 2015/0008839 | A1 * | 1/2015 | Zhang | .................. G09G 3/3406 315/210 |

* cited by examiner

*Primary Examiner* — Thai Pham
(74) *Attorney, Agent, or Firm* — Tung & Associates (57) ABSTRACT

A light emitting device driver circuit drives a light emitting circuit. The light emitting device driver circuit includes a switching power supply circuit and a current regulator circuit. The current regulator circuit includes a multi-level DC current control circuit, which individually determines whether plural DC current supply circuits are conducted or not conducted according to a DC dimmer signal to supply a DC current to the light emitting circuit; and a switching current control circuit, which operates a PWM switch according to a PWM dimmer signal to supply a PWM current to the light emitting device circuit. The DC current and the PWM current are summed together to form a total current flowing through the light emitting device circuit so that the brightness of the light emitting device circuit is adjustable according to the DC dimmer signal and the PWM dimmer signal.

14 Claims, 8 Drawing Sheets

LIGHT EMITTING DEVICE DRIVER CIRCUIT AND CONTROL METHOD THEREOF

CROSS REFERENCE

The present invention claims priority to U.S. 62/545,161 filed on Aug. 14, 2017 and CN 201810650830.7 filed on Jun. 22, 2018.

BACKGROUND OF THE INVENTION

Field of Invention

The present invention relates to a light emitting device driver circuit and control method; particularly, it relates to a light emitting device driver circuit and control method with dimmer function.

Description of Related Art

Figure 1A:
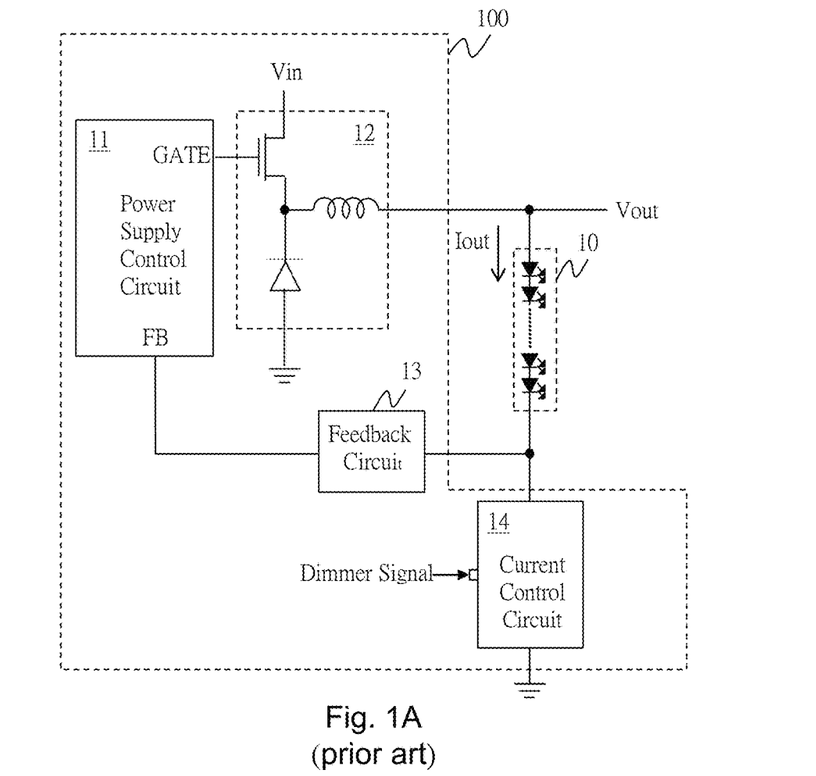
FIG. 1A shows a schematic diagram of a conventional light emitting diode (LED) driver circuit 100.

FIG. 1A shows a schematic diagram of a conventional light emitting diode (LED) driver circuit 100. As shown in FIG. 1A, the LED driver circuit 100 drives a LED circuit 10. The LED driver circuit 100 includes a power supply control circuit 11, a power stage circuit 12, a feedback circuit 13 and a current control circuit 14. The power supply control circuit 11 is electrically coupled to the feedback circuit 13 to receive a feedback signal FB related to an output voltage Vout and generate an operation signal GATE according to the feedback signal FB for operating a power switch of the power stage circuit 12 so as to convert an input voltage Vin to the output voltage Vout which is supplied to the LED circuit 10. The brightness of the LED circuit 10 is controlled by an output current Iout. When the LED driver circuit 100 has a dimmer function, the current control circuit 14 has a pin for receiving a dimmer signal; the dimmer signal can adjust an average of the output current Iout to adjust the brightness of the LED circuit 10. The power stage circuit 12 may be a synchronous and non-synchronous buck, boost, inverting, buck-boost, inverting-boost, or flyback power stage circuit as shown in FIGS. 2A to 2k.

Figure 1B:
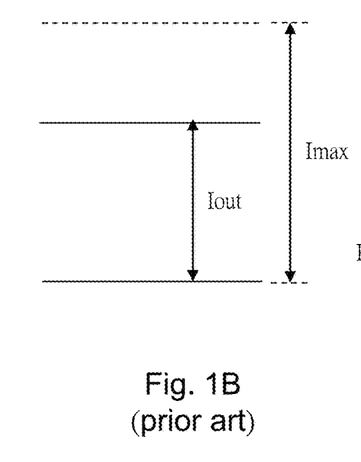
FIG. 1B shows schematic signal waveforms of the output current Iout and the operation signal GATE according to conventional technology.

In the prior art, there are two ways to adjust the brightness of the LED circuit 10: analog dimming and digital dimming. The analog dimming is to adjust the level of the output current Iout by the current control circuit 14 according to the received dimmer signal. As shown in FIG. 1B, the current control circuit 14 regulates the output current Iout to a level between 0 and the maximum current Imax according to the dimmer signal so that the level of the output current Iout is adjusted according to the dimmer signal to achieve the dimming purpose. The brightness of the LED circuit 10 is higher as the output current Iout flowing through the LED circuit 10 is adjusted higher.

On the other hand, the digital dimming is to generate a pulse width modulation (PWM) signal by the current control circuit 14 according to the dimmer signal. Referring to the signal waveforms shown in FIG. 1C, the current control circuit 14 controls the time (on-time Ton) in which the PWM signal stays at a high level H, i.e., to adjust the duty ratio, thereby controlling the time in which the output current Iout stays at the current maximum value Imax, so as to control the brightness of the LED circuit 10. More specifically, the brightness of the LED circuit 10 is related to the average of the output current Iout. The average value of the output current Iout is the current maximum value Imax multiplied by the duty ratio, wherein the duty ratio is obtained by the on-time Ton divided by the cycle period Tdim. In general, the on-time minimum Ton (min) is approximately in an order of tens of nanoseconds (ns) to tens of microseconds (hs), so the switching frequency of the operation signal is approximately between several hundred hertz (Hz) and several kilohertz.

Figure 1C:
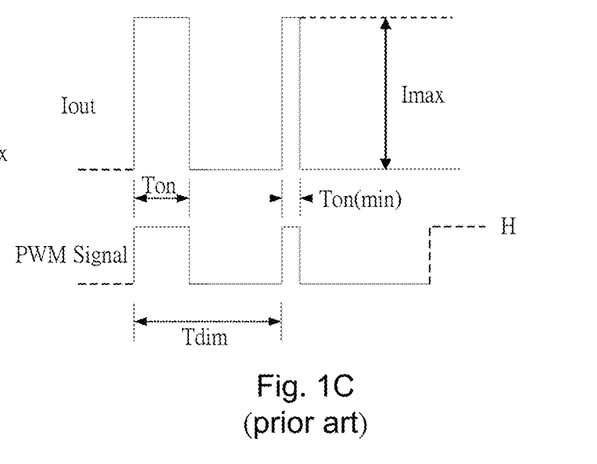
FIG. 1C shows schematic signal waveforms of the output current Iout and the levels of the maximum current Imax according to conventional technology.
Figure 2A:
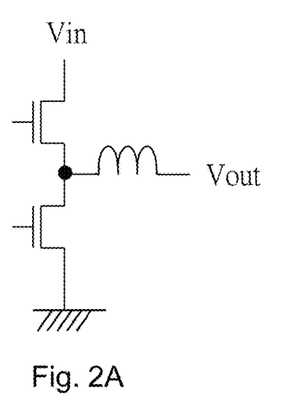
FIGS. 2A to 2K show schematic diagrams of synchronous or asynchronous buck, boost, inverting, buck-boost, inverting-boost, and flyback power circuits.
Figure 2B:
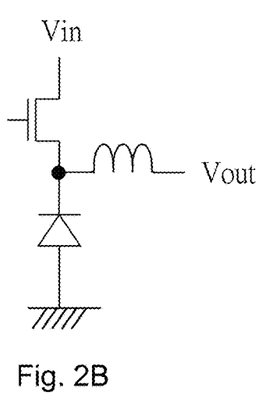
Figure 2C:
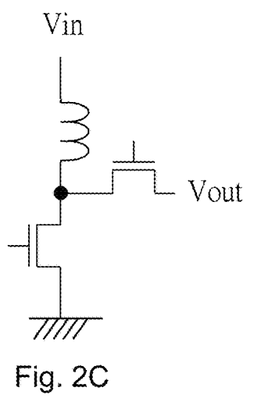
Figure 2D:
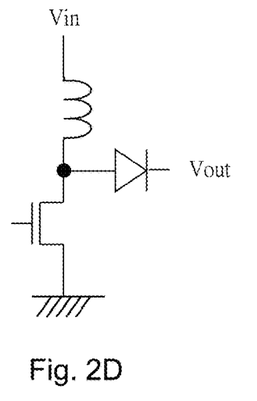
Figure 2E:
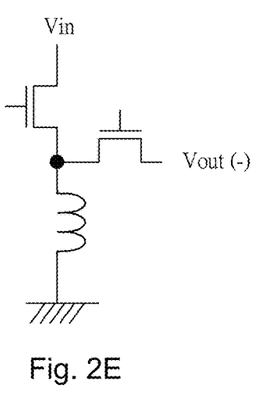
Figure 2F:
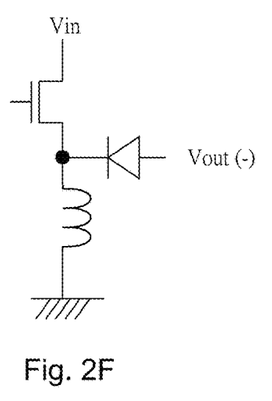
Figure 2G:
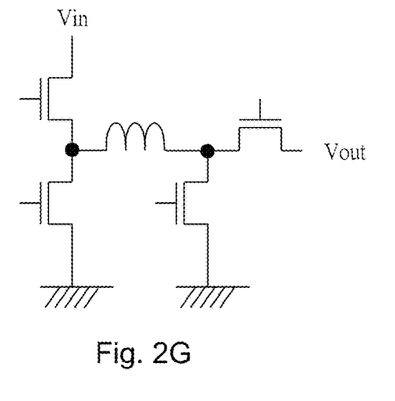
Figure 2H:
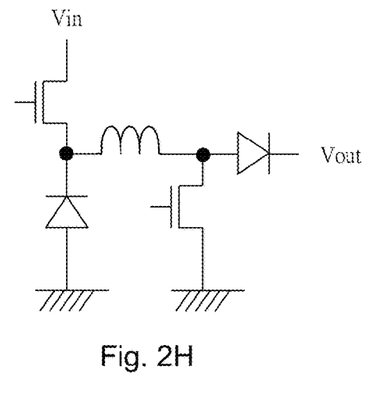
Figure 2I:
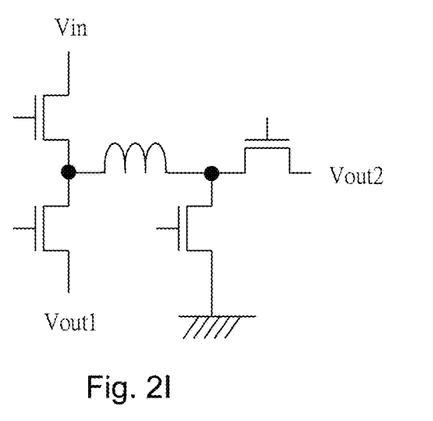
Figure 2J:
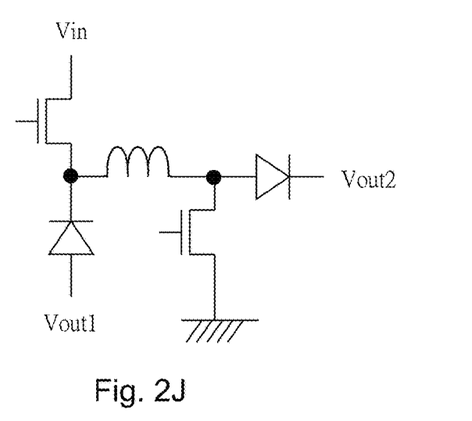
Figure 2K:
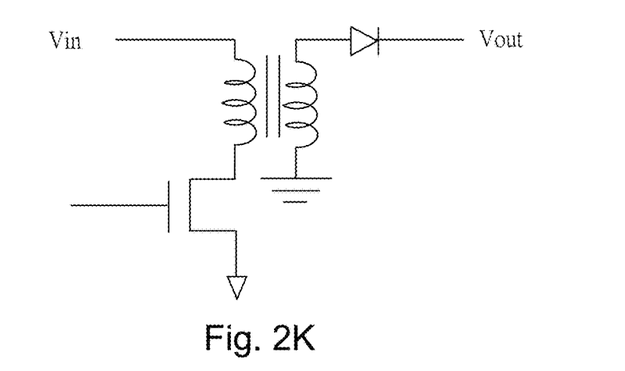

The digital dimming of the prior art described above has disadvantages of low frequency flicker and audio noise. In addition, the conduction reaction time of the LED circuit 10 becomes slower as the output current Iout increases; this lowers the dimming resolution. On the other hand, another prior art, the analog dimming has a disadvantage of causing color drift of the light emitting device circuit.

In view of the above, to overcome the drawbacks of the prior art, the present invention provides a light emitting device driver circuit and a control method thereof for improving problems such as flicker, noise, low resolution, and color drift of the light emitting device, without lowering the dimming resolution.

SUMMARY OF THE INVENTION

From one perspective, the present invention provides a light emitting device driver circuit, which is configured to operably drive a light emitting device circuit, the light emitting device driver circuit comprising: a switching power supply circuit, which is configured to operably control at least one power switch therein to convert an input voltage to an output voltage according to a feedback signal, for supplying power to the light emitting device circuit; and a current regulator circuit, which includes: a multi-level DC current control circuit, including a plurality of DC current supply circuits, the multi-level DC current control circuit being configured to determine whether the plurality of DC current supply circuits are individually conducted or not conducted according to a DC dimmer signal to supply a DC current to the light emitting circuit; and a switching current control circuit, which is configured to operate a pulse width modulation (PWM) switch according to a PWM dimmer signal, so as to supply a PWM current to the light emitting device circuit; wherein the DC current and the PWM current are summed together to generate a light emitting device current flowing through the light emitting device circuit so that the brightness of the light emitting device circuit is adjustable according to the DC dimmer signal and the PWM dimmer signal.

In one preferable embodiment, each of the DC current supply circuits, when conducted, supplies a DC sub-current and the DC sub-currents provided by the conduction of the DC current supply circuits are summed together to form the DC current, wherein each DC sub-current is not lower than a unit current and an average of the PWM current is not higher than the unit current.

In one preferable embodiment, each of the DC sub-currents is a constant value.

In one preferable embodiment, the multi-level DC current control circuit includes: a current switch, which is coupled to the light emitting device circuit, and is configured to operably control the path of the DC current; a switch control circuit, which is coupled to the current switch, and is configured to operably control the current switch according to a reference voltage; the DC current supply circuits, each of which is coupled to the current switch, and is configured to individually determine whether to turn ON a sub-switch therein according to the DC dimmer signal, so as to supply or not supply a corresponding DC sub-current, wherein the DC sub-currents provided by the conduction of the DC current supply circuits are summed together to form the DC current.

In one preferable embodiment, the switching current control circuit includes: the PWM switch, which is coupled to the light emitting device driver circuit, and is configured to operate according to the PWM signal to supply the PWM current; and a PWM switch control circuit, which is coupled to the PWM switch, and is configured to control the PWM switch according to a reference voltage.

In one preferable embodiment, the switching power supply circuit includes: a power stage circuit, which is configured to operate the at least one power switch according to an operation signal, for supplying the power to the light emitting device circuit; a control circuit, which is coupled to the power stage circuit, and is configured to generate the operation signal according to a feedback signal related to the output voltage; and a feedback signal generation circuit, which is coupled to the power stage circuit, and is configured to generate the feedback signal according to the output voltage.

In one preferable embodiment, the DC power supply circuit is a current source circuit or a current sink circuit.

From another perspective, the present invention also provides a control method of a light emitting device driver circuit, wherein the light emitting device driver circuit is configured to drive a light emitting device circuit, the method comprising: controlling at least one power switch to convert an input voltage to an output voltage according to a feedback signal, wherein the output voltage is for supplying to the light emitting device circuit; individually determining whether a plurality of DC current supply circuits are conducted or not conducted according to a DC dimmer signal to supply a DC current to the light emitting device circuit; and operating a PWM switch according to a PWM dimmer signal to supply a PWM current to the light emitting device circuit; wherein the DC current and the PWM current are summed together to generate a light emitting device current flowing through the light emitting device circuit so that the brightness of the light emitting device circuit is adjustable according to the DC dimmer signal and the PWM dimmer signal.

In one preferable embodiment, each of the DC current supply circuits, when conducted, supplies a DC sub-current and the DC sub-currents provided by the conduction of the DC current supply circuits are summed together to form the DC current, wherein each DC sub-current is not lower than a unit current and an average of the PWM current is not higher than the unit current.

In one preferable embodiment, each of the DC sub-currents is a constant value.

In one preferable embodiment, the step of individually determining whether a plurality of DC current supply circuits are conducted or not conducted according to a DC dimmer signal to supply a DC to the light emitting device circuit includes: providing to a current switch coupled to the light emitting device circuit for controlling the path of the DC current; controlling the current switch according a reference voltage; and determining whether to turn ON a sub-current switch in each of the DC current supply circuits according to the DC dimmer signal so as to determine whether or not to provide a DC sub-current, wherein the DC sub-currents provided by the conduction of the DC current supply circuits are summed together to form the DC current.

In one preferable embodiment, the step of operating a PWM switch according to a PWM dimmer signal to supply a PWM current to the light emitting device circuit includes: operating the PWM switch according to the PWM dimmer signal to supply the PWM current; and controlling the PWM switch in a saturation region according to a reference voltage.

In one preferable embodiment, the step of controlling a PWM switch according to a PWM dimmer signal to supply a PWM current to the light emitting device circuit includes: operating the least one power switch according to an operation signal for supplying the power to the light emitting device circuit; generating the operation signal according to a feedback signal related to the output voltage; and generating the feedback signal according to the output voltage.

In one preferable embodiment, the DC current supply circuit is a current source circuit or a current sink circuit The objectives, technical details, features, and effects of the present invention will be better understood with regard to the detailed description of the embodiments below.

DESCRIPTION OF THE PREFERRED EMBODIMENTS

The drawings in the present invention are schematic, and mainly intended to indicate the coupling relationship among each of the circuits and the relationship among each of the signal waveforms. As for the circuit, the signal waveform and the frequency are not drawn in proportion.

Figure 3:
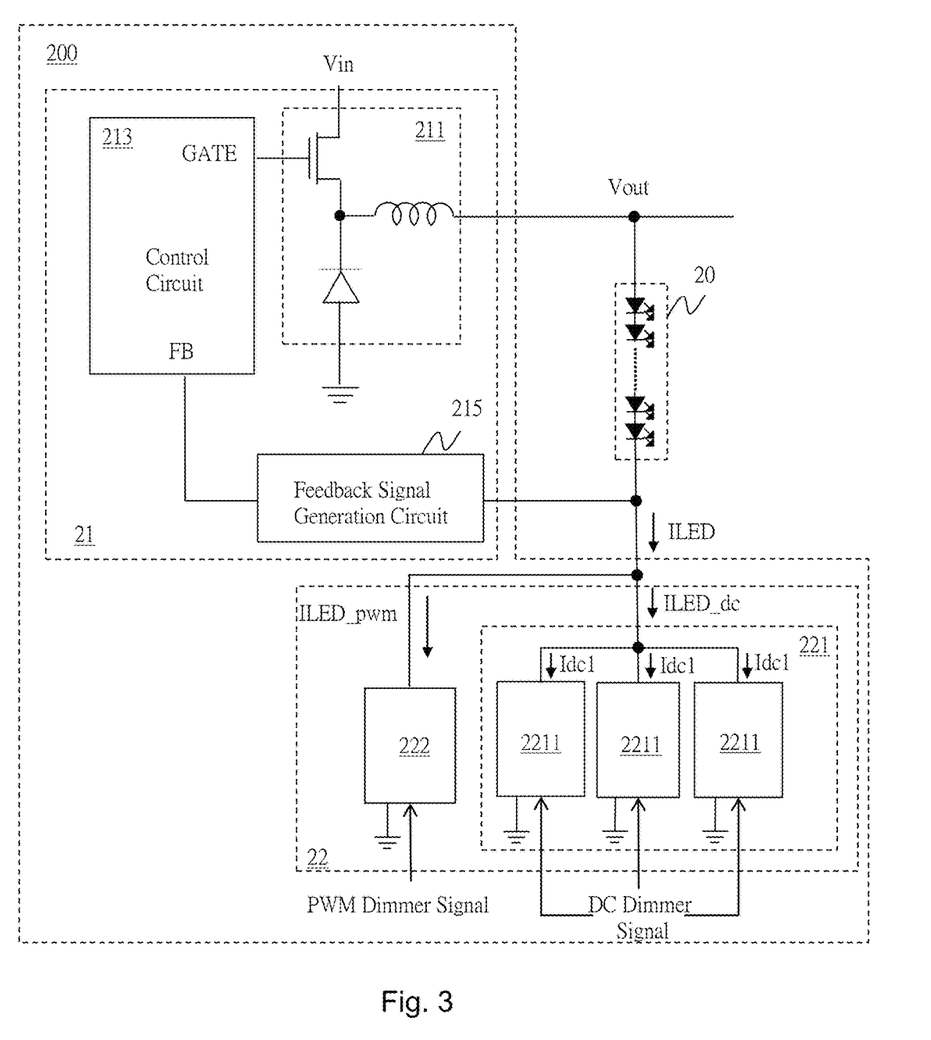
FIG. 3 shows a first embodiment of the present invention.

FIG. 3 shows a first embodiment of the present invention. As shown in the figure, the light emitting device driver circuit 200, which is configured to drive the light emitting device circuit 20, includes a switching power supply circuit 21 and a current regulator circuit 22. The switching power supply circuit 21 is configured to control at least one power switch according to a feedback signal FB to convert an input voltage Vin to an output voltage Vout to supply the power to the light emitting device circuit 20.

The switching power supply circuit 21 includes a power stage circuit 211, a control circuit 213, and a feedback signal generation circuit 215. The power stage circuit 211 is configured to operate at least one power switch according to the operation signal GATE to supply the power to the light emitting device circuit 20. The power stage circuit 211 can be a synchronous or asynchronous buck, boost, inverting, buck-boost, inverting-boost, or flyback power stage circuit as shown in FIGS. 2A to 2k. The control circuit 213 is coupled to the power stage circuit 211 for generating the operation signal GATE according to the feedback signal FB which is related to the output voltage Vout. The feedback signal generation circuit 215 is coupled to the power stage circuit 211 and the control circuit 213 for generating the feedback signal FB according to the output voltage Vout.

The current regulator circuit 22 includes a multi-level DC current control circuit 221 and a switching current control circuit 222. The multi-level DC current control circuit 221 is configured to individually conduct or not conduct the DC current supply circuits 2211 therein according to a DC dimmer signal, so as to supply a DC current ILED_dc to the light emitting device circuit 20. The DC sub-currents Idc1 provided by the DC current supply circuits 2211 may be the same or different from one another. Each of the DC current supply circuits 2211 supplies the DC sub-current Idc1 when it is conducted. The DC sub-currents Idc1 provided by the DC current supply circuits 2211 are summed together to form the DC current ILED_dc. Each of the DC sub-currents Idc1 is not lower than a unit current Iunit. A pulse width modulation (PWM) current ILED_pwm is provided by the multi-level DC current control circuit 221, and an average current of the PWM current ILED_pwm is not higher than the unit current Iunit. In one preferable embodiment, the DC sub-current Idc1 is a constant value (constant current).

The switching current control circuit 222 operates a PWM switch (not shown, to be described in detail later) to supply the PWM current ILED_pwm to the light emitting device circuit 20. The DC current ILED_dc and the PWM current ILED_pwm are summed together to form the light emitting device current ILED flowing through the light emitting device circuit 20, whereby the brightness of the light emitting device circuit 20 is adjustable according to the DC dimmer signal and the PWM dimmer signal.

Figure 4:
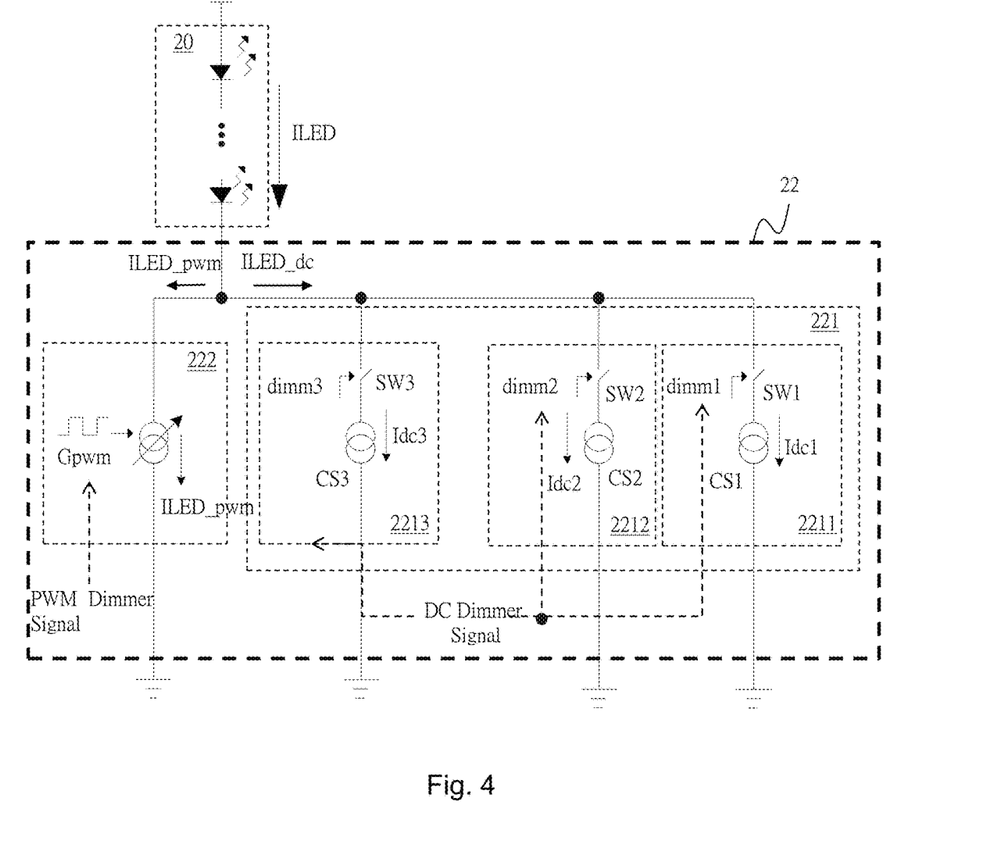
FIG. 4 shows a second embodiment of the present invention.

FIG. 4 shows a second embodiment of the present invention. FIG. 4 shows one embodiment of the current regulator circuit 22 in accordance with the present invention. As shown in FIG. 4, the current regulator circuit 22 includes the multi-level DC current control circuit 221 and the switching current control circuit 222. The multi-level DC current control circuit 221 is configured to individually conduct or not conduct the DC current supply circuits 2211, 2212, and 2213 according to the DC dimmer signal (the number of DC current supply circuits is plural; in this embodiment, three DC current supply circuits are shown as an example) to supply the DC current ILED_dc to the light emitting device circuit 20. The switching current control circuit 222 is configured to generate a PWM signal Gpwm according to the PWM dimmer signal, to operate the PWM switch (not shown, to be described in detail later) to supply the PWM current ILED_pwm to the light emitting device circuit 20. The DC current ILED_dc and the PWM current ILED_pwm are summed together to form the light emitting device current ILED which flows through the light emitting device circuit 20, whereby the brightness of the light emitting device circuit 20 is adjustable according to the DC dimmer signal and the PWM dimmer signal.

As shown in the figure, the DC current supply circuit 2211 includes, for example, a switch SW1 and a sink circuit CS1, wherein a dimmer signal dimm1 is generated according to the DC dimmer signal to determine whether the switch SW1 is conducted or not conducted, so as to determine whether or not a DC sub-current Idc1 is generated as a portion of the DC current ILED_dc, wherein the DC sub-current Idc1 is, for example but not limited to, a constant value. The DC current supply circuit 2212 includes, for example, a switch SW2 and a sink circuit CS2, wherein a dimmer signal dimm2 is generated according to the DC dimmer signal to determine whether the switch SW2 is conducted or not conducted, so as to determine whether or not a DC sub-current Idc2 is generated as a portion of the DC current ILED_dc, wherein the DC sub-current Idc2 is, for example but not limited to, a constant value. The DC current control circuit 2213 includes, for example, a switch SW3 and a sink circuit CS3, wherein a dimmer signal dimm3 is generated according to the DC dimmer signal to determine whether the switch SW3 is conducted or not conducted, so as to determine whether or not a DC sub-current Idc3 is generated as a portion of the DC current ILED_dc, wherein the DC sub-current Idc3 is, for example but not limited to, a constant value. Each of the DC sub-currents Idc1, Idc2 and Idc3 is not lower than the PWM current ILED_pwm. The DC sub-currents Idc1, Idc2, and Idc3 supplied by the conducted current supply circuits 2211, 2212, and 2213 are summed together to form a DC current ILED_dc, and each of the DC sub-currents Idc1, Idc2, and Idc3 is not lower than a unit current Iunit. And, an average current of the PWM current ILED_pwm is not higher than the unit current Iunit.

It should be noted that, according to the present invention, the DC current supply circuits can respectively provide different DC sub-currents to be summed together to form the required DC current. Of course, the DC current control circuits can also provide the same DC sub-currents to be summed together to form the required DC current. Further, according to the present invention, the DC current supply circuit and the switching current control circuit control and generate the sub-current and the PWM current in different manners. In one embodiment, the DC current supply circuit controls and generates a DC sub-current for example by a linear regulator (LDO) or by controlling transistor in its linear region to generate the DC sub-current. The switching current control circuit controls and generates the PWM current by a PWM signal which operates at least one PWM switch to regulate the PWM current. In a preferable embodiment according to the present invention, the frequency of the PWM signal is, for example but not limited to, higher than 20 kHz to avoid falling into the audible range.

It should be noted that the present invention is superior to the prior art in at least the following aspect: the present invention combines the multi-level DC dimming and the PWM dimming to adjust the brightness of the light emitting device circuit, thereby obtaining a higher brightness resolution and avoiding the disadvantages of the prior art. The multi-level DC dimming macro-adjusts the brightness of the light emitting device circuit to a certain macro level, wherein the gap between two different macro levels is relatively larger; and the PWM dimming micro-adjusts the brightness of the light emitting device circuit to fine-tune the brightness on the basis of the macro level, wherein the PWM dimming can have a higher switching frequency than in the prior art. As a result, the present invention not only can improve the brightness resolution of the light emitting device circuit, but also can avoid the low-frequency flicker and audio noise (20 Hz~20 kHz) generated by the PWM dimming, and further, the present invention can reduce the reaction time, and avoid the color drift of the light emitting device circuit.

Figure 5:
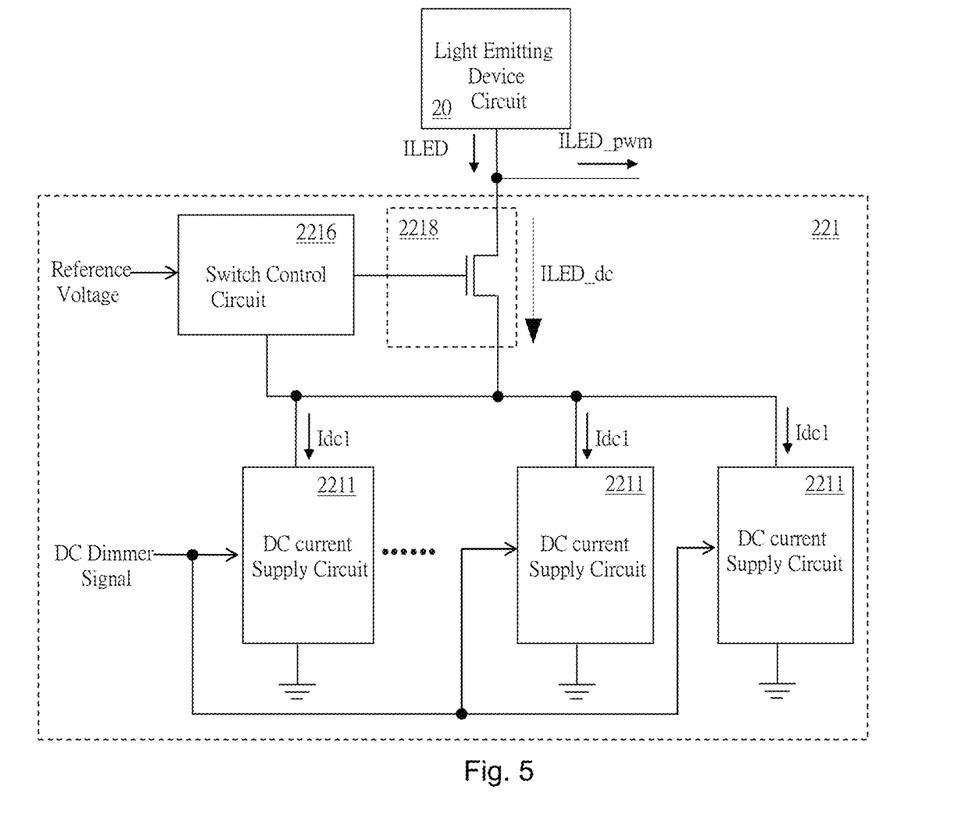
FIG. 5 shows a third embodiment of the present invention.

FIG. 5 shows a third embodiment of the present invention. As shown, the multi-level DC current control circuit 221 includes plural DC current supply circuits 2211, a current switch 2218, and a switch control circuit 2216. The current switch 2218, which is electrically connected to the light emitting device circuit 20, is configured to control the path of the DC current ILED_dc. The switch control circuit 2216 is coupled to the current switch 2218 for controlling the current switch 2218 according to a reference voltage. The plural DC current supply circuits 2211 are electrically connected to the current switch 2218, and each of the DC current supply circuits 2211 individually determines whether to turn ON a sub-switch therein according to the DC dimmer signal, so as to determine whether or not to supply the corresponding DC sub-current Idc1 as a portion of the DC current ILED_dc.

Figure 6A:
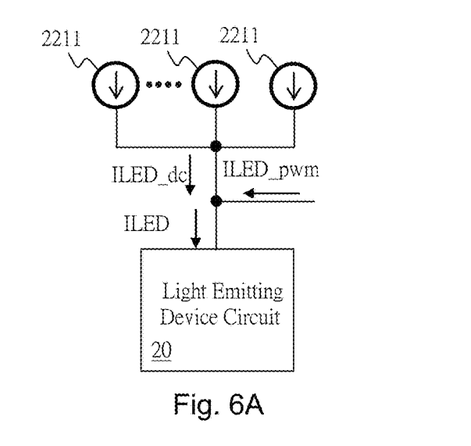
FIGS. 6A-6B show a fourth embodiment of the present invention.
Figure 6B:
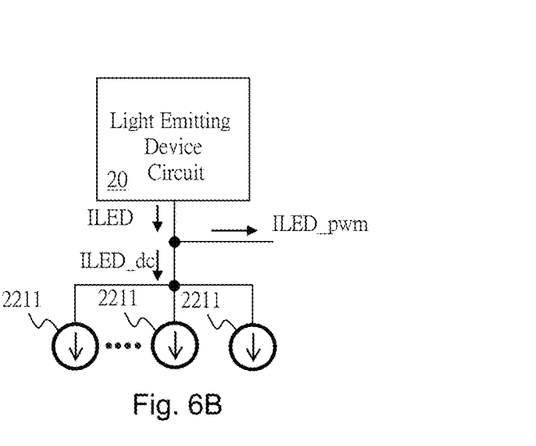

FIGS. 6A-6B show two embodiments of the present invention. These embodiments show that the DC current supply circuit 2211 may be a current source circuit or a current sink circuit. As shown in FIG. 6A, the DC current supply circuit 2211 may be a current source circuit. As shown in FIG. 6B, the DC current supply circuit 2211 may be a current sink circuit. Current source circuits and current sink circuits are well known to a person having ordinary skill in the art, so the details thereof are not redundantly explained here.

Figure 7:
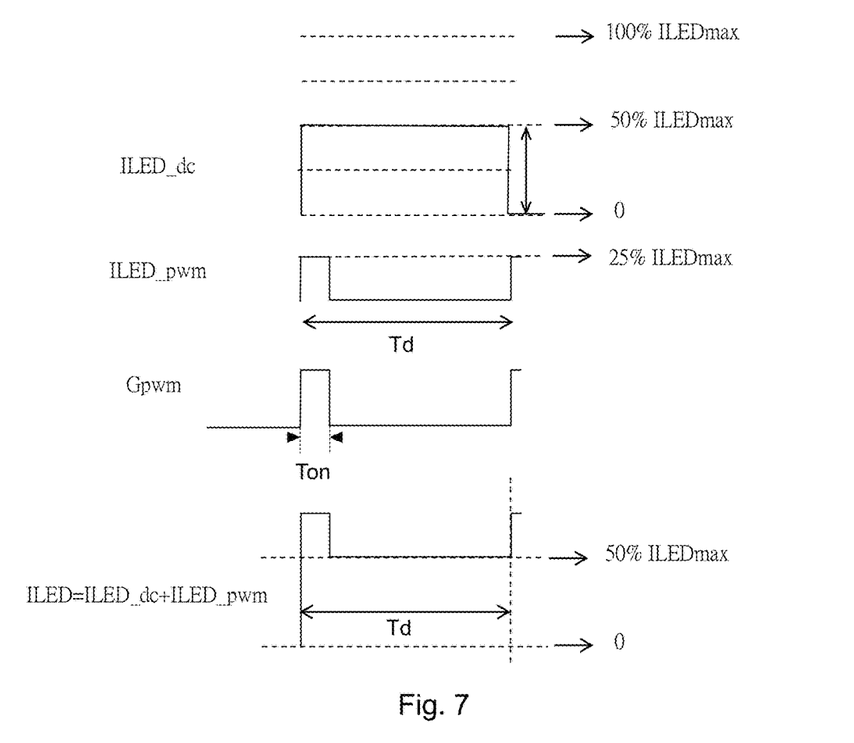
FIG. 7. shows schematic signal waveforms of the direct current ILED_dc, the pulse width modulation current ILED_pwm, the pulse width modulation signal Gpwm, and the light emitting device current ILED according to the present invention.

FIG. 7 shows the signal waveforms of the DC current ILED_dc, the PWM current ILED_pwm, the PWM signal Gpwm, and the light emitting device current ILED according to the present invention. In this embodiment, as an example, the multi-level DC current control circuit macro-adjusts the brightness of the light emitting device circuit in three macro levels; for example, the multi-level DC current control circuit includes three DC current supply circuits, each of which can provide 25% of a maximum value ILEDmax of the light emitting device current ILED, that is, DC sub-current $Idc1$=maximum value $ILED$-$max*25\%$, and the unit current $Iunit$=maximum value $ILEDmax*25\%$.

More specifically, for example, when two DC current supply circuits are determined to be conducted, and one DC current supply circuit is not conducted, the DC current ILED_dc is 50% of the maximum value ILEDmax of the light emitting device current ILED, which is supplied to the light emitting device circuit 20. The switching current control circuit micro-adjusts (fine-tunes) the brightness of the light emitting device circuit according to the dimmer signal by the PWM control; for example, the PWM signal has an on-time Ton of 150.2 nanoseconds (ns) and a cycle period Td of 38.46 microseconds (µs) (in 26 kHz frequency), that is, a PWM current ILED_pwm having a duty ratio of 1/256 (the resolution of the PWM signal is, for example, 8 bits), and an amplitude of 25% of the maximum value ILEDmax of the light emitting device current ILED is supplied to the light emitting device circuit 20. The DC current ILED_dc and the PWM current ILED_pwm are summed to become the light emitting device current ILED as shown in the figure, and the average current is 50.098% of the maximum value ILEDmax of the light emitting device current ILED. When the duty ratio is the maximum value (=1), the average current of the PWM current ILED_pwm is ILEDmax*25%, which is equal to the unit current Iunit, and is not more than the unit current Iunit, that is, the average current of the PWM current ILED_pwm is not more than the unit current Iunit.

In this example, the dimming resolution is 1/256 of the maximum value ILEDmax of the light emitting device current ILED, which avoids the disadvantages of the prior art described above. Of course, in a different embodiment, the DC current supply circuit can provide a smaller current, such as but not limited to 12.5% of the maximum value ILEDmax of the light emitting device current ILED, that is, Idc1=ILEDmax*12.5%, wherein the unit current Iunit=ILEDmax*12.5%.

Figure 8:
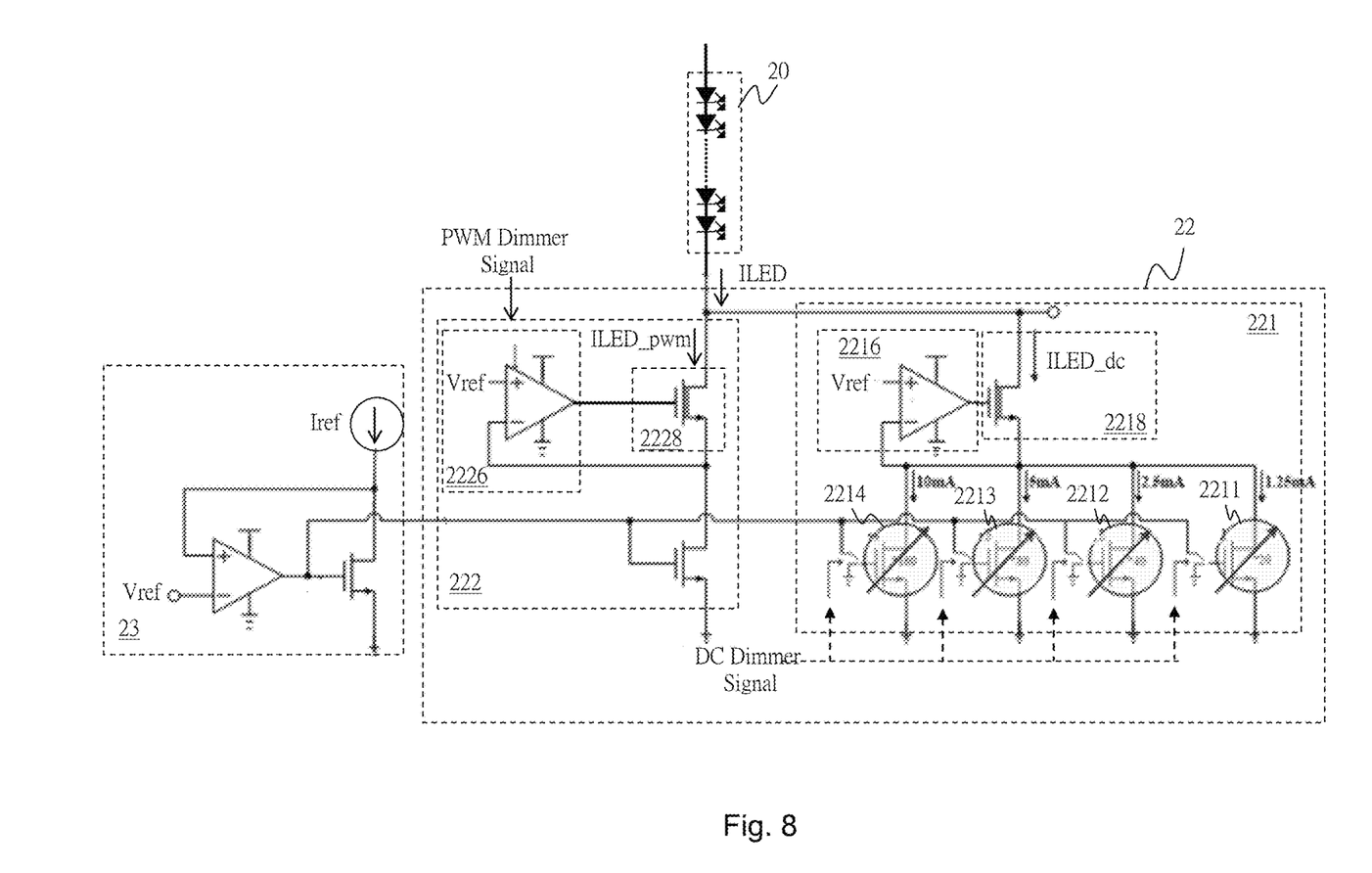
FIG. 8 shows a fifth embodiment of the present invention.

FIG. 8 shows a fifth embodiment of the present invention. This embodiment shows a more specific embodiment of the current regulator circuit 22. As shown in the figure, in the present embodiment, the multi-level DC current control circuit 221 has four DC current supply circuits 2211, 2212, 2213, and 2214, respectively providing different DC sub-currents, such as but not limited to: 1.25 milliamperes (mA), 2.5 mA, 5 mA and 10 mA. By different combinations of conducting and/or not conducting the four DC current supply circuits 2211, 2212, 2213, and 2214, the DC current ILED_dc can range from 0 to 18.75 mA. In this embodiment, for example, the PWM current ILED_pwm can be adjusted in a range from 0 to 1.25 mA. Thus, by summing the DC current ILED_dc and the PWM current ILED_pwm, the light source current ILED can be adjusted in a range from 0 to 20 mA; that is the switching current control circuit 222 greatly increases the dimming resolution of the current regulator circuit 22.

In the multi-level DC current control circuit 221, the switch control circuit 2216 includes, for example but not limited to, an amplifier circuit as shown in the figure, to ensure that the transistor switch device in the current switch 2218 operates in a saturation region according to the reference voltage Vref, to provide a stable DC current ILED_dc.

In the switching current control circuit 222, a PWM switch 2228 is coupled to the light emitting device circuit 20, and is configured to be operated according to the PWM dimmer signal to provide the PWM current ILEDpwm. A PWM switch control circuit 2266 is coupled to the PWM switch 2228, and is configured to control the PWM switch 2228 to operate in the saturation region according to the reference voltage Vref, to provide a stable the PWM current ILED_pwm.

In one embodiment, as shown in the figure, a reference current supply circuit 23 includes a current source which provides a reference current Iref and an amplifier circuit which stabilize the reference current Iref according to a reference voltage Vref. The PWM dimmer signal is a PWM signal, and different duty ratios of the PWM signal change the average of the PWM current ILEDpwm to further adjust the brightness of the light emitting device circuit 20.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. The various embodiments described above are not limited to being used alone; two embodiments may be used in combination, or a part of one embodiment may be used in another embodiment. Between two circuits or components shown to be directly connected in an embodiment, other circuits or components that do not affect the main function can be inserted. For another example, the light emitting device is not limited to the light emitting diode (LED) shown in each embodiment and may be other types of light emitting circuits. For another example, the light emitting devices can form an array of plural LED strings connected in parallel. For another example, a PMOS device shown in the embodiments may be replaced by an NMOS device, with corresponding amendments to the circuit and the signals. For another example, variations of all embodiments can be used collectively or interchangeably. For example, the embodiment of FIG. 6A may also be applied to other embodiments (such as but not limited to the first, second, third, or fifth embodiments), etc. For another example, the power supply and/or current supply circuit in the present invention is not limited to a DC-DC power supply and/or current supply circuit, but can be an AC-DC power supply and/or current supply circuit. In addition, in the same spirit of the invention, those skilled in the art can think of various equivalent variations and various combinations. For example, in the context of the present invention, "processing, operating, or generating a certain output result according to a certain signal" is not limited to performing an action based on the signal itself, but may be performing an action based on the signal in a converted form, such as: the signal may be processed by voltage-current conversion, current-voltage conversion, ratio conversion, etc. The scope of the present invention should include what are defined in the claims and the equivalents.

What is claimed is:

1. A light emitting device driver circuit, which is configured to operably drive a light emitting device circuit, the light emitting device driver circuit comprising:
   a switching power supply circuit, which is configured to operably control at least one power switch therein to convert an input voltage to an output voltage according to a feedback signal, for supplying power to the light emitting device circuit; and
   a current regulator circuit, which includes:
      a multi-level DC current control circuit, including a plurality of DC current supply circuits, the multi-level DC current control circuit being configured to determine whether the plurality of DC current supply circuits are individually conducted or not conducted according to a DC dimmer signal to supply a DC current to the light emitting circuit; and
      a switching current control circuit, which is configured to operate a pulse width modulation (PWM) switch according to a PWM dimmer signal, so as to supply a PWM current to the light emitting device circuit;
      wherein the DC current and the PWM current are summed together to generate a light emitting device current flowing through the light emitting device circuit so that the brightness of the light emitting device circuit is adjustable according to the DC dimmer signal and the PWM dimmer signal.

2. The light emitting device driver circuit of claim 1, wherein each of the DC current supply circuits, when conducted, supplies a DC sub-current and the DC sub-currents provided by the conduction of the DC current supply circuits are summed together to form the DC current, wherein each DC sub-current is not lower than a unit current and an average of the PWM current is not higher than the unit current.

3. The light emitting device driver circuit of claim 2, wherein each of the DC sub-currents is a constant value.

4. The light emitting device driver circuit of claim 1, wherein the multi-level DC current control circuit includes:
   a current switch, which is coupled to the light emitting device circuit, and is configured to operably control the path of the DC current;
   a switch control circuit, which is coupled to the current switch, and is configured to operably control the current switch according to a reference voltage; and
   the DC current supply circuits, each of which is coupled to the current switch, and is configured to individually determine whether to turn ON a sub-switch therein according to the DC dimmer signal, so as to supply or not supply a corresponding DC sub-current, wherein the DC sub-currents provided by the conduction of the DC current supply circuits are summed together to form the DC current.

5. The light emitting device driver circuit of claim 1, wherein the switching current control circuit includes:
   the PWM switch, which is coupled to the light emitting device driver circuit, and is configured to operate according to the PWM signal to supply the PWM current; and
   a PWM switch control circuit, which is coupled to the PWM switch, and is configured to control the PWM switch according to a reference voltage.

6. The light emitting device driver circuit of claim 1, wherein the switching power supply circuit includes:
   a power stage circuit, which is configured to operate the at least one power switch according to an operation signal, for supplying the power to the light emitting device circuit;
   a control circuit, which is coupled to the power stage circuit, and is configured to generate the operation signal according to a feedback signal related to the output voltage; and
   a feedback signal generation circuit, which is coupled to the power stage circuit, and is configured to generate the feedback signal according to the output voltage.

7. The light emitting device driver circuit of claim 1, wherein the DC current supply circuit is a current source circuit or a current sink circuit.

8. A control method of a light emitting device driver circuit, wherein the light emitting device driver circuit is configured to drive a light emitting device circuit, the method comprising:
   controlling at least one power switch to convert an input voltage to an output voltage according to a feedback signal, wherein the output voltage is for supplying to the light emitting device circuit;
   individually determining whether a plurality of DC current supply circuits are conducted or not conducted according to a DC dimmer signal to supply a DC current to the light emitting device circuit; and
   operating a PWM switch according to a PWM dimmer signal to supply a PWM current to the light emitting device circuit;
   wherein the DC current and the PWM current are summed together to generate a light emitting device current flowing through the light emitting device circuit so that the brightness of the light emitting device circuit is adjustable according to the DC dimmer signal and the PWM dimmer signal.

9. The control method of claim 8, wherein each of the DC current supply circuits, when conducted, supplies a DC sub-current and the DC sub-currents provided by the conduction of the DC current supply circuits are summed together to form the DC current, wherein each DC sub-current is not lower than a unit current and an average of the PWM current is not higher than the unit current.

10. The control method of claim 8, wherein each of the DC sub-currents is a constant value.

11. The control method of claim 8, wherein the step of individually determining whether a plurality of DC current supply circuits are conducted or not conducted according to a DC dimmer signal to supply a DC to the light emitting device circuit includes:
   providing to a current switch coupled to the light emitting device circuit for controlling the path of the DC current;

controlling the current switch according a reference voltage; and determining whether to turn ON a sub-current switch in each of the DC current supply circuits according to the DC dimmer signal so as to determine whether or not to provide a DC sub-current, wherein the DC sub-currents provided by the conduction of the DC current supply circuits are summed together to form the DC current.

12. The control method of claim 8, wherein the step of operating a PWM switch according to a PWM dimmer signal to supply a PWM current to the light emitting device circuit includes:

operating the PWM switch according to the PWM dimmer signal for providing the PWM current; and controlling the PWM switch in a saturation region according to a reference voltage.

13. The control method of claim 8, wherein the step of controlling at least one power switch to convert an input voltage to an output voltage for supplying power to the light emitting circuit includes:

operating the at least one power switch according to an operation signal for supplying the power to the light emitting circuit;

generating the operation signal according to a feedback signal related to the output voltage; and generating the feedback signal according to the output voltage.

14. The control method of claim 8, wherein the DC current supply circuit is a current source circuit or a current sink circuit.

* * * * *